3,068,271
PREPARATION OF CARALKOXYVINYL PHOSPHATE TRIESTER INSECTICIDES
Charles H. Tieman, Modesto, Calif., assignor to Shell Oil Company, New York, N.Y., a corporation of Delaware
No Drawing. Filed May 5, 1961, Ser. No. 107,933
10 Claims. (Cl. 260—461)

This invention relates to a process for the preparation of insecticides. More particularly, this invention relates to a process for the preparation of the insecticidally more active isomeric form of certain phosphorus esters.

Neutral esters of acids of pentavalent phosphorus in which one of the ester groups is a vinyl group substituted on the beta carbon atom thereof form a well known general class of insecticides, various subclasses thereof being described in such United States Patents as U.S. Nos. 2,744,-128; 2,765,331; 2,788,358; 2,865,944; 2,867,646; 2,891,-887; 2,894,014; 2,894,018; 2,895,982; 2,898,341; 2,913,367, and 2,956,073, and in such British patents as No. 783,697. It has been found that in the cases of these compounds wherein the beta carbon atom of the vinyl ester group is mono-substituted, or is di-substituted by two different substituents (i.e. asymmetrically di-substituted), these compounds can exist in the forms of two geometric isomers. This is illustrated in the following schematic diagrams, wherein R represents the phosphorus acid moiety, R' and R" each represents hydrogen or an organic group and $R^0$ represents an organic group which is different from and larger R". Thus:

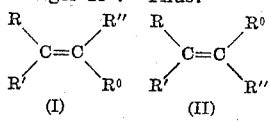

By "larger" is meant that the group $R^0$ is of greater weight than R". The form wherein the phosphorus acid moiety, R, and the substituent group $R^0$ are on the same side of the olefinic double bond (diagram (II)) will be considered to be the cis form, while the trans form will be considered to be that represented by diagram (I), wherein the phosphorus acid moiety, R, and the substituent group $R^0$ are on opposite sides of the olefinic double bond.

The evidence available indicates that the isomer wherein the large groups R and $R^0$ are trans to each other is much more insecticidally active than is the corresponding cis isomer.

As shown in the patents already mentioned herein, these compounds ordinarily are prepared by reacting a neutral ester of an acid of trivalent phosphorus with a non-acidic carbonyl compound (that is, a carbonyl compound of the class consisting of aldehydes and ketones) in which the alpha carbon atom is substituted by an atom of halogen and also by the group $R^0$. This method for preparation of these esters can be illustrated by the following general equation, and by the following specific illustration showing preparation of a typical species of these esters. In general terms, the reaction proceeds:

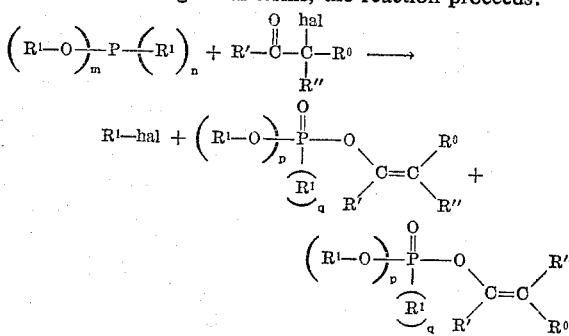

wherein hal is halogen, preferably middle halogen (i.e., bromine or chlorine), R', R" and $R^0$ have the respective meanings already assigned herein, $R^1$ is organic, m is 1, 2 or 3, $m+n=3$, $p=m-1$, and $p+q=2$. This general reaction is illustrated by the preparation of dimethyl 2-carbomethoxy-1-methylvinyl phosphate by the reaction of trimethyl phosphite with methyl alpha-chloroacetoacetate, viz:

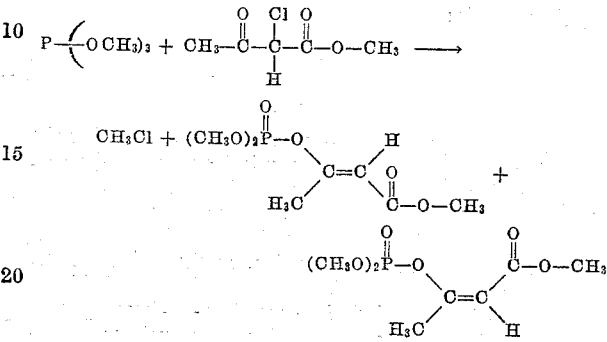

This general reaction, and the manner in which it is conducted is set out in detail in the patents already mentioned herein, U.S. 2,956,073 describing the process in the greatest detail.

It has been found that this method of preparation results in a mixture of the two isomers, usually in the ratio of about 50–65 percent of the more active isomer and 35–50% of the less active isomer. The isomer of higher insecticidal activity is of course preferred, so that a process that results in a product containing a substantially higher content of that isomer would be highly desirable.

Such a process has now been discovered. Briefly, this process comprises reacting a triester of a trivalent acid of phosphorus with a carbonyl compound in which the alpha carbon atom is substituted by an atom of halogen and also by the group $R^0$ in the manner heretofore known, but including one or more of particular alcohols in the reaction mixture. Thus, it has been found that by conducting the reaction of the phosphorus ester and the halocarbonyl compound in the presence of an alcohol other than methanol, ethanol, and n-propyl alcohol, there is ordinarily effected an increase in the insecticidally active isomer content of the product of the order of 25% or even more, with a corresponding reduction in the amount of the undesired less active isomer.

As pointed out in the patents already mentioned, the suitable phosphorus ester reactants are those wherein $R^1$ represents hydrocarbon or substituted hydrocarbon, preferably of low molecular weight, for example containing from 1 to 10 carbon atoms. Preferably, one of the groups $R^1$—O— is alkoxy of from one to four carbon atoms since these compounds react most readily with the halogenated carbonyl compound. Otherwise, the group $R^1$ may be aliphatic, cycloaliphatic, aromatic or of mixed structure. When aliphatic, it may be either straight-chain or branched-chain in configuration. Typewise, the preferred organic groups include alkyl, cycloalkyl, aryl, alkaryl, and like groups. Illustrative examples include the methyl, ethyl, n- and isopropyl groups, the various isomeric butyl, pentyl, hexyl and octyl groups, the cyclopentyl, cyclohexyl and like cycloalkyl groups, the phenyl group; the naphthyl group, the benzyl, phenethyl, p-methylbenzyl and like aralkyl groups; the isomeric tolyl groups, the isomeric xylyl groups, the ethylphenyl group, the 2,4-dimethyl- and 3,5-dimethylphenyl and like alkaryl groups, and the like.

Where p is 2—that is, in the phosphate insecticides—the two symbols, $R^1$, may together represent a divalent hydrocarbon group, each of the symbols representing one valence bond thereof. In such reactants, it is preferred that the divalent group be an alkylene group of up to 10 carbon atoms, with 1 to 5—preferably 2 to 3—carbon atoms in the chain thereof which bonds together the indicated oxygen atoms.

The substituted hydrocarbon groups represented by $R^1$ are those of the above-mentioned hydrocarbon groups which are substituted by one or more non-hydrocarbon substituents. The preferred substituents are middle halogen, the nitro group and amine groups represented by the formula:

and ether groups, $R^1$—O—, wherein $R^1$, $p$ and $q$ has the meaning already set out herein, $v$ is 1 or 2 and $v+w=2$.

Illustrative examples of the non-hydrocarbon groups include monohaloalkyl groups, such as the chloromethyl and bromomethyl groups, the 2-chloroethyl, 1-bromopropyl, 3-chloropropyl and the like; polyhaloalkyl groups, such as the dichloromethyl, tribromomethyl, 1,2-dichloroethyl, 2,2-dibromoethyl, 3,3-dichloro-2-bromopropyl groups, and the like; nitroalkyl groups such as the 2-nitroethyl group, halo-substituted aromatic groups such as the various isomeric chloro- and bromophenyl groups, the various isomeric polyhalophenyl groups, such as the 2,6-dichlorophenyl group, the 3,5-dibromophenyl group and the like; amino-substituted groups, such as the 2-aminoethyl group, the 2-dimethylaminoethyl group and the like; the aniline group; the p-dimethylaminophenyl group; the p-ethylaminobenzyl group and the like.

Of particular interest because of the high insecticidal activity of the insecticides made from them are the phosphites ($m=3$) wherein each $R^1$ is lower hydrocarbon—particularly alkyl of up to seven carbon atoms, aryl of up to ten carbon atoms or aralkyl of up to 10 carbon atoms, particularly the phenyl or benzyl group.

The group $R^0$ can be halogen, preferably middle halogen, one of the groups represented by $R^1$, or it can be a functional organic group, such as an aliphaticoxycarbonyl group, particularly a carboalkoxy or an alkoxyalkyleneoxycarbonyl group of up to ten carbon atoms; it may represent an ether group, $R^1$—O—, wherein $R^1$ has the meaning already set out; it may represent an acyloxyalkoxycarbonyl group wherein the acyl group is

or a sulfur analog thereof, or it may represent an amide group having the amino moiety set out above.

The groups represented by each of R' and R" suitably can be one of those represented by $R^1$ and $R^0$, or either or both of R' and R" can be hydrogen, or R" can be halogen, preferably middle halogen.

The preferred organic groups represented by the symbol $R^0$ are those having the formula

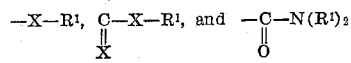

wherein X represents oxygen or sulfur and $R^1$ has the meaning already set out herein. Of most importance from the standpoint of the insecticidal activity of the phosphorus esters prepared from them are those wherein $R^0$ represents a carboalkoxy group of up to six carbon atoms, an aralkyloxycarbonyl group of up to ten carbon atoms, or an aminocarbonyl group of up to ten carbon atoms, and R" is hydrogen.

The manner in which the reaction between the phosphorus ester and the halogen-substituted carbonyl compound is carried out is clearly described in the art—for example, U.S. Patent No. 2,956,073 describes the process in detail. In general, the reaction is carried out by simply mixing the two reactants and maintaining the reaction mixture at the desired temperature. Temperatures within the range of from about 0° C. to about 150° C. are suitable, with temperatures of from about 10° C. to about 110° C. usually being preferred. About stoichiometric proportions of the reactants are generally used, although an excess—up to 100%, for example—can sometimes be used to advantage. Inert diluents can be used as solvents to moderate the reaction or to render the reaction mixture readily fluid. However, as will be pointed out in more detail hereinafter, it often will be found preferable to employ the added alcohol as solvent. Evolved halide—$R^1$-hal—the by-product, desirably is removed from the reaction as it is formed, as by conducting the reaction mixture at a temperature at which the halide is a gas and removing it from the reaction zone as it forms. Workup of the final reaction mixture is conventional, details being given in U.S. Patent No. 2,956,073.

According to the present invention, the reaction is conducted in a manner identical to that taught by the art, with the exception that the reaction is carried out in the presence of the alcohol. The suitable alcohols have been found to be the alcohols other than methanol, ethanol, and n-propyl alcohol. It has been found that methanol and ethanol are not suitable for the purposes of the present invention, for as is set forth in copending application Serial No. 127,524 filed July 28, 1961, when more than a minor amount of either of these two alcohols is present in the reaction mixture, the reaction takes a different course to produce an alpha-hydroxyalkylphosphonate, rather than the vinyl ester. It is believed that n-propanol also causes the reaction to take the different course to a substantial extent. Isopropyl alcohol and alcohols containing four or more carbon atoms do not cause the reaction to take the different course to a significant extent; consequently, they are suitable for the purposes of the present invention.

Couched in affirmative terms, the suitable alcohols have been found to be isopropyl alcohol, monohydric alcohols of four or more carbon atoms, and the polyhydric alcohols. By "alcohols containing four or more carbon atoms" is meant those compounds containing at least four carbon atoms wherein the only significant functional moiety is an alcoholic hydroxyl group bonded to an aliphatic carbon atom, for it is compounds of this kind which modify the reaction of the phosphorus ester and the halocarbonyl compound to produce higher yields of the insecticidally more active isomer of the product vinyl ester. This definition excludes alcohols which contain substituent groups which are reactive with any of the components of the reaction mixtures involved and also excludes alcohols containing acetylenic linkages. While the suitable alcohols may be olefinically unsaturated, the alcohols which do not contain olefinic unsaturation are generally to be preferred, to avoid possible reactivity with components of the reaction mixtures involved. The most suitable alcohols appear to be those containing only carbon, oxygen and hydrogen atoms. The two principal groups of these alcohols are the unsubstituted alcohols containing, in addition to one or more alcoholic hydroxyl groups, only carbon and hydrogen atoms, and the ether-alcohols—that is, alcohols containing one or more oxy (—O—) linkages. The suitable alcohols can be of either straight-chain or branched-chain configuration and may contain in their structure either or both of alicyclic or aromatic carbon-to-carbon moieties, provided that the alcoholic hydroxyl group(s) is(are) bonded only to aliphatic carbon. Examples of suitable alcohols include the aliphatic hydrocarbon alcohols, such as the alkanols, including both straight-chain and branched-chain configurations, and including for example, n-butanol and its various branched-chain isomers, and the straight-chain and branched-chain isomeric $C_5$—, $C_6$—, $C_7$—, $C_8$—, $C_9$—, and $C_{10}$— and like alcohols, specific members thereof being n-hexanol, n-octanol, 2-ethyl-1-hexanol, 1-decanol, sec-butyl alcohol, tert-butyl alcohol, isobutyl alcohol, isoamyl alcohol, sec-butylcarbinol, sec-amyl alcohol, 2-octanol, 5-ethyl-2-nonanol, lauryl, myristyl and cetyl alcohols, 7-ethyl-2-methyl-4-undecanol, 3,9-diethyl-6-tridecanol; cycloalkanols such as cyclohexanol; ethylene glycol, propylene glycol, trimethylene glycol, glycerol, and like polyhydric alcohols; benzyl alcohol, phenethyl alcohol, and like aralkyl alcohols; cyclohexyl carbinol, 2-cyclohexanethanol and like alicyclic-substituted alcohols. Also suitable are ether-alcohols, including for example, 2-methoxyethanol, 2-butyloxyethanol, 2-(2-methoxyethoxy)ethanol, 2-benzyloxyethanol, 2-phenoxyethanol, diethylene glycol, and the like. Of particular interest because of their availability at low cost and their desirable physical properties are the alcohols of this kind which contain not more than 20 atoms in the molecule.

The selection of the particular alcohol to be used in many cases will depend upon the phosphorus reactant used and/or upon the phosphorus ester product desired, for it has been found that some of the suitable alcohols can react with the phosphorus reactant and/or the phosphorus ester product to interchange the organic moiety of the alcohol with ester moieties of the phosphorus reactant and/or the phosphorus ester product. Thus, for example, where the phosphorus reactant is a trialkyl phosphite, represented by the formula $(RO)_3P$, and the alcohol used has the formula $R'OH$, the final product instead of having two groups, $RO-$, may have one or two groups, $R'O-$, resulting from ester interchange. In selecting the particular alcohol to be used, this fact must be kept in mind. Thus, if it is desired that no ester interchange occur, either an alcohol corresponding to the ester moiety or moieties of the phosphorus reactant and phosphorus ester product must be used, or an inert alcohol must be used. Alternatively, if ester interchange is desired, then the suitable alcohol for effecting the interchange is used. It has been found that the primary alcohols (n-alcohols) are most reactive in the ester interchange reaction, while secondary alcohols are slightly reactive and tertiary alcohols are inert. If ester interchange is to be avoided, then it is desirable to employ a tertiary alcohol. Where the phosphorus reactant is a trialkyl phosphite, tertiary butyl alcohol is particularly useful, since it is readily available at low cost, and its presence does not complicate recovery of the phosphorus ester product.

In many cases, only a small amount of the alcohol—for example, about 0.01 mole per mole of the halocarbonyl reactant—will be required to produce the desired effect upon the reaction. However, it ordinarily will be found desirable to employ at least about 0.1 mole of the alcohol per mole of the halocarbonyl reactant. Further, in these and other cases, it may be found desirable to employ larger amounts of the alcohol, using the alcohol as solvent to moderate the reaction and/or to maintain a readily fluid reaction mixture. In such cases as much as ten, twenty or even a greater number of moles of alcohol can be employed per mole of halocarbonyl reactant. It has been found that larger amounts of solvent tend to increase the proportion of the insecticidally more active isomer of the product. In any given case, the economics involved will determine the optimum amount of the alcohol used. Ordinarily, however, use of more than about fifty moles of alcohol per mole of halocarbonyl reactant will be found to be of little additional value over the use of lesser amounts of alcohol.

It is desirable that the alcohol be present from the outset of the reaction. The reactants and the alcohol can all be mixed simultaneously; however, because of the exothermic nature of the reaction, such a technique may not be useful on a large scale. In such a case, it is desirable to mix the alcohol with one reactant, then add the other reactant at such a rate that the reaction temperature can be controlled as desired. From the experimental data obtained it appears preferable to mix the alcohol with the halocarbonyl compound and then gradually commingle the phosphorus ester with that mixture, as by slowly introducing the ester into the stirred mixture.

It has been found that an equimolar amount or a moderate excess of the phosphorus ester can be used—an excess of from about 5% to about 50% being suitable in most cases.

The manner in which the phosphorus ester product is recovered from the reaction mixture will depend upon the physical characteristics of the alcohol used, whether a solvent was used, and upon like factors. Where the volatility of the alcohol permits, distillation techniques are entirely suitable. Otherwise, solvent extraction, followed by distillation, crystallization or other procedures, can be used.

The following examples will illustrate the efficacy of the improvement provided by this invention for producing higher yields of the trans-isomers of the substituted vinyl esters of phosphorus acids.

To ascertain the effect of alcohols upon the isomer distribution in the preparation of neutral esters of pentavalent phosphorus in which one of the ester groups is a vinyl group functionally substituted on the carbon atom thereof, by reaction of a neutral ester of an acid of trivalent phosphorus with a non-acidic carbonyl compound, the preparation of dimethyl 2-methoxycarbonyl-1-methylvinyl phosphate by reaction of trimethyl phosphite and methyl alpha-chloroacetoacetate was carried out in the presence of various alcohols, and these in various amounts. In each case, a moderate excess of trimethyl phosphite was added to a solution or mixture of the acetoacetate in the alcohol, and the product was recovered by distillation techniques. Table I sets out the reaction conditions and the results which were obtained.

Table I

| Alcohol | Amount of methyl 2-chloroacetoacetate used [1] | Temp., °C | Time, hours | Percent trans isomer [2] |
|---|---|---|---|---|
| Isopropyl alcohol | 417 | 80 | 2.5 | 77 |
| Do | 125 | 80 | 2.0 | 83 |
| Do | 25 | 80 | 2.0 | 92 |
| n-Butanol | 25 | 25 | 24.0 | [3] 84 |
| t-Butyl alcohol | 25 | 80 | 2.0 | 86 |
| Do | 5 | 85 | 4.0 | 87 |
| None | | 80 | 2.0 | 64 |

[1] Grams methyl 2-chloroacetoacetate per 100 milliliters of solvent.
[2] Based only on the vinyl phosphate in the product.
[3] In this case, the product was wholly the di-n-butyl ester, since the alcohol reacted with the dimethyl ester.

It is evident from these experimental results that the presence of the alcohol markedly increases the ratio of the trans to the cis isomer.

I claim as my invention:

1. In a process for preparing a dialkyl 2-alkoxycarbonyl-1-methylvinyl phosphate by the reaction of a trialkyl phosphite with an alkyl 2-haloacetoacetate, the improvement which comprises conducting the reaction in the presence of from about 0.1 to about 50 moles per mole of said alkyl 2-haloacetoacetate of an alcohol of the group consisting of isopropyl alcohol, unsubstituted mono- and polyhydric alcohols containing from 4 to 20 carbon atoms and free from acetylenic unsaturation, and such alcohols containing from one to a plurality of oxy (—O—) linkages.

2. The improvement according to claim 1 wherein the alcohol is a tertiary monohydric alcohol.

3. In a process for preparing a dialkyl 2-alkoxycarbonyl-1-methylvinyl phosphate by the reaction of a trialkyl phosphite with an alkyl 2-haloacetoacetate, the improvement which comprises conducting the reaction in the presence of from about 0.1 to about 50 moles per mole of said alkyl 2-haloacetoacetate of tertiary butyl alcohol.

4. In a process for preparing dimethyl 2-methoxycarbonyl-1-methylvinyl phosphate by the reaction of trimethyl phosphite with methyl 2-chloroacetoacetate, the improvement which comprises conducting the reaction in the presence of from about 0.1 to about 50 moles per mole of said methyl 2-haloacetoacetate of an alcohol of the group consisting of isopropyl alcohol, unsubstituted mono- and polyhydric alcohols containing from 4 to 20 carbon atoms and free from acetylenic unsaturation, and such alcohols containing from one to a plurality of oxy (—O—) linkages.

5. The improvement according to claim 4 wherein the alcohol is a tertiary monohydric alcohol.

6. In a process for preparing dimethyl 2-methoxycarbonyl-1-methylvinyl phosphate by the reaction of trimethyl phosphite with methyl 2-chloroacetoacetate, the improvement which comprises conducting the reaction in the presence of from about 0.1 to about 50 moles per mole of said methyl 2-haloacetoacetate of tertiary butyl alcohol.

7. In a process which involves the reaction:

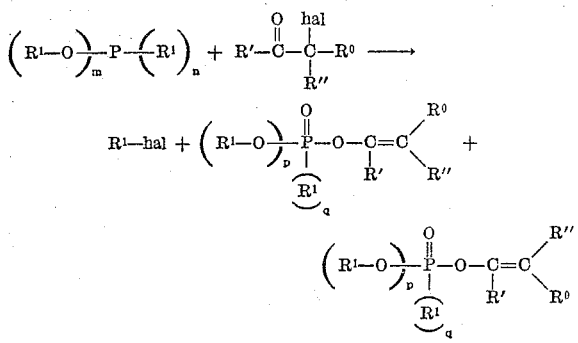

wherein $m$ is an integer from 1 to 3, $m+n=3$, $p=m-1$, $p+q=2$, "hal" is middle halogen, $R^1$ is an organic radical containing up to 10 carbon atoms of the group consisting of alkyl, cycloalkyl, aryl, alkaryl and aralkyl radicals and such radicals substituted by from one to a plurality of substituents of the group consisting of middle halogen, nitro, amino of the formula $-N(H)_v(R^1)_w$ and ether of the formula $R^1-O-$, with the proviso that in at least one of $R^1-O-$ in the reactant of the formula

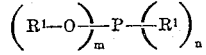

$R^1$ is lower alkyl, $R'$ is a member of the group consisting of hydrogen and organic radicals represented by $R^1$, $R''$ is a member of the group consisting of hydrogen, middle halogen and organic radicals represented by $R^1$, and $R^0$ is a member of the group consisting of middle halogen, organic radicals represented by $R^1$, and functional radicals of up to 10 carbon atoms of the group consisting of carboalkoxy, ether of the formula $R^1-O-$, alkyleneoxycarbonyl, acyloxyalkoxycarbonyl wherein the acyl moiety has the formula $R^1-C(O)-$, aralkyoxycarbonyl, amido of the formula $-C(O)-N(H)_v(R^1)_w$, and the sulfur analogs of these radicals, with the proviso that $R^0$ is different from and of higher molecular weight that $R''$, the improvement which comprises conducting the said reaction in the presence of from about 0.1 to about 50 moles per mole of the carbonyl compound $$R'-C(O)-C(hal)(R'')(R^0)$$

of an alcohol of the group consisting of isopropyl alcohol, unsubstituted mono- and polyhydric alcohols containing from 4 to 20 carbon atoms and free from acetylenic unsaturation, and such alcohols containing from one to a plurality of oxy (—O—) linkages.

8. The improvement according to claim 7 wherein the alcohol is a branched-chain monohydric alcohol.

9. The improvement according to claim 7 wherein the alcohol is a tertiary monohydric alcohol.

10. The improvement according to claim 7 wherein the alcohol is tertiary butyl alcohol.

References Cited in the file of this patent

UNITED STATES PATENTS

| | | |
|---|---|---|
| 2,685,552 | Stiles | Aug. 3, 1954 |
| 2,943,975 | Metivier | July 5, 1960 |